(12) United States Patent
Gicquel

(10) Patent No.: US 9,261,623 B2
(45) Date of Patent: Feb. 16, 2016

(54) TARGET ASSEMBLY INCLUDING TEMPERATURE ACTIVATED COUPLER AND RELATED METHODS

(71) Applicant: Frederic Gicquel, Pennington, NJ (US)

(72) Inventor: Frederic Gicquel, Pennington, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 143 days.

(21) Appl. No.: 14/344,738

(22) PCT Filed: Sep. 16, 2012

(86) PCT No.: PCT/US2012/055681
§ 371 (c)(1),
(2) Date: Mar. 13, 2014

(87) PCT Pub. No.: WO2013/040530
PCT Pub. Date: Mar. 21, 2013

(65) Prior Publication Data
US 2014/0353480 A1    Dec. 4, 2014

Related U.S. Application Data

(60) Provisional application No. 61/535,119, filed on Sep. 15, 2011.

(51) Int. Cl.
*G01V 5/10* (2006.01)
*H05H 6/00* (2006.01)

(52) U.S. Cl.
CPC . *G01V 5/104* (2013.01); *H05H 6/00* (2013.01)

(58) Field of Classification Search
CPC .................................. G01V 5/04; G01V 5/104

USPC ........................................ 250/256, 429, 336.1
See application file for complete search history.

(56) References Cited

U.S. PATENT DOCUMENTS

| | | | |
|---|---|---|---|
| 3,546,512 A | 12/1970 | Frentrop | |
| 3,756,682 A | 9/1973 | Frentrop | |
| 4,600,838 A | 7/1986 | Steinman et al. | |
| 4,721,853 A | 1/1988 | Wraight | |
| 4,794,792 A | 1/1989 | Flaum et al. | |
| 4,864,098 A * | 9/1989 | Basanese | H01S 3/005 219/121.61 |
| 5,293,410 A | 3/1994 | Chen et al. | |
| 5,313,504 A | 5/1994 | Czirr | |
| 5,608,224 A | 3/1997 | Alvord | |
| 5,631,767 A * | 5/1997 | Dodge | G01J 1/4257 252/584 |
| 5,774,514 A | 6/1998 | Rubbia | |

(Continued)

FOREIGN PATENT DOCUMENTS

| | | |
|---|---|---|
| RU | 893114 A1 | 5/1994 |
| RU | 2243610 C2 | 12/2004 |
| SU | 525038 A1 | 8/1976 |

OTHER PUBLICATIONS

International Search Report for International Application No. PCT/US2012/055681 dated Dec. 20, 2012.

*Primary Examiner* — David Porta
*Assistant Examiner* — Djura Malevic
(74) *Attorney, Agent, or Firm* — Michael Dae

(57) ABSTRACT

A target assembly for a radiation generator may include a target body and a beam dump. The target assembly may also include a temperature activated coupler between the target body and the beam dump to move the beam dump between a non-contact position with the target body and a contact position with the target body based upon temperature.

23 Claims, 6 Drawing Sheets

(56) References Cited

U.S. PATENT DOCUMENTS

| | | | | |
|---|---|---|---|---|
| 5,793,012 A * | 8/1998 | Ortiz, Jr. | ................ | B23K 26/06 219/121.6 |
| 6,792,017 B2 * | 9/2004 | Halpin | ................... | B23K 26/42 219/121.6 |
| 7,073,378 B2 | 7/2006 | Smits et al. | | |
| 7,982,191 B2 | 7/2011 | Friedman et al. | | |
| 8,047,663 B2 * | 11/2011 | Pang | ..................... | G02B 5/003 219/121.6 |
| 2002/0018498 A1 * | 2/2002 | Heberle | ................. | F28D 20/02 372/35 |
| 2004/0065646 A1 * | 4/2004 | Halpin | ................... | B23K 26/42 219/121.61 |
| 2007/0278417 A1 * | 12/2007 | Horsky | ................. | H01J 27/205 250/427 |
| 2008/0048133 A1 * | 2/2008 | Bykanov | ................ | H05G 2/003 250/504 R |
| 2008/0056642 A1 * | 3/2008 | Byer | .................... | G02B 6/4296 385/27 |

* cited by examiner

TARGET ASSEMBLY INCLUDING TEMPERATURE ACTIVATED COUPLER AND RELATED METHODS

BACKGROUND

A generator of high energy neutrons may be particularly useful for neutron-gamma ray or neutron-neutron logging in oil well logging tools, for example. One type of generator for use in a well logging tool, for example, is a sealed-tube neutron generator.

A sealed-tube neutron generator may have four major features. First, a sealed-tube neutron generator may have a gas source to supply reacting elements, such as, deuterium and tritium, for example. A sealed-tube neutron generator may also have an ion source that strips electrons from gas molecules, thus generating a plasma of electrons and positively charged ions. A sealed-tube neutron generator may also include a target impregnated with deuterium and/or tritium, and an accelerating gap which propels the ions from the plasma to the target with such energy that the bombarding ions collide and fuse with the deuterium or tritium nuclei of the target to generate and emit neutrons therefrom.

Ordinarily, a plasma of positively charged ions and electrons is produced by energetic collisions of electrons and uncharged gas molecules within the ion source. Two types of ion sources may be used in a neutron generator, for example, for well logging tools. One type is a cathode (a.k.a. Penning) ion source, and another type is a hot (a.k.a. thermionic) cathode ion source. These ion sources may include anode and cathode electrodes of different potential that contribute to plasma production by accelerating electrons to energy higher than the ionization potential of the gas. Collisions of those energetic electrons with gas molecules produce additional electrons and ions.

A Penning ion source may increase collision efficiency by increasing the distance that the electrons travel within the ion source before they are neutralized by striking a positive electrode. The electron path length is increased by establishing a magnetic field, which is perpendicular to the electric field within the ion source. The combined magnetic and electrical fields may cause the electrons to define a helical path within the ion source, which may substantially increase the distance traveled by the electrons within the ion source. Accordingly, the collision probability may be enhanced, and thus the ionization and dissociation efficiency of the device. Examples of a neutron generator that includes a Penning ion source used in a logging tool are described, for example, in U.S. Pat. Nos. 3,546,512 and 3,756,682 both to Fentrop, both of which are assigned the present assignee, Schlumberger Technology Corporation, and both of which are hereby incorporated by reference in their entirety.

A hot cathode ion source may include a dispenser cathode formed from a material that emits electrons when heated. A grid electrode extracts electrons from the cathode which, in turn, ionizes the gas, generating ions. An extracting or focusing electrode extracts ions and focuses such ions to form an ion beam. An example of a neutron generator that includes a hot cathode ion source used in a logging tool is described in U.S. Pat. No. 5,293,410 to Chen et al., assigned to the assignee of the present application, Schlumberger Technology Corporation, and the entire contents of which are hereby incorporated by reference.

In such a system, the target floats at a negative high voltage potential on the order of −70 kV to −160 kV (or less), for example, with the ion source electrodes operating around ground potential to provide the electric field gradient for accelerating ions toward the target with enough energy that the bombarding ions generate and emit neutrons therefrom. About 10 watts of power may be dissipated in the target, and the target is surrounded by high voltage insulation. Because of poor thermal conduction to the exterior (due to electrical insulators generally being poor thermal conductors), the temperature of the target can increase significantly compared to ambient temperature. At a relatively high ambient temperature, the target may overheat, which may thus lead to failure (loss of neutron output) of the neutron generator.

SUMMARY

The summary is provided to introduce a selection of concepts that are further described below in the detailed description. This summary is not intended to identify key or essential features of the claims subject matter, nor is it intended to be used as an aid in limiting the scope of the claimed subject matter.

A target assembly for a radiation generator may include a target body and a beam dump. The target assembly may also include a temperature activated coupler between the target body and the beam dump to move the beam dump between a non-contact position with the target body and a contact position with the target body based upon temperature.

Another aspect is directed to a logging tool for a borehole within a subterranean formation. The logging tool may include a radiation detector and a radiation generator coupled to the radiation detector. The radiation generator may include an ion source and a target assembly spaced from the ion source. The target assembly may include a target body and a beam dump. The target assembly may also include a temperature activated coupler between the target body and the beam dump to move the beam dump between a non-contact position with the target body and a contact position with the target body based upon temperature.

A method aspect is directed to a method of controlling a temperature of a beam dump with a temperature activated coupler between a target body and the beam dump. The method may include exposing the temperature activated coupler to changing temperatures to move the beam dump between a non-contact position with the target body and a contact position with the target body.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to refer to like elements in different embodiments.

Figure 1:
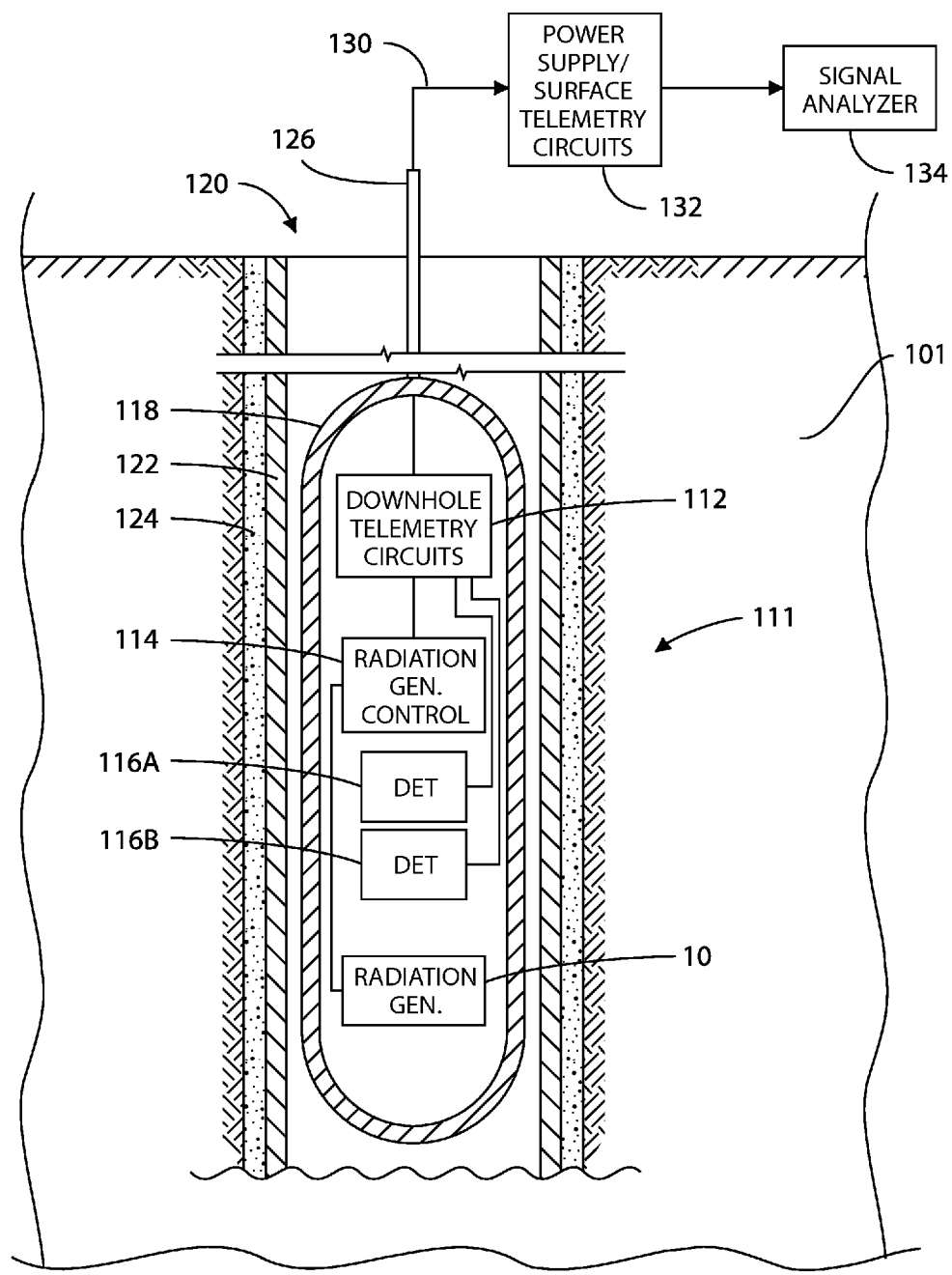
FIG. 1 is a schematic diagram of a logging tool within a subterranean formation in accordance with an embodiment.

Referring initially to FIG. 1, a logging tool 111 for a borehole 120 within a subterranean formation 101 includes a housing defining a sonde or probe 118. The probe 118 is moved along a path of travel through the borehole 120. A steel casing 122 and a surrounding cement annulus 124 are included in the borehole 120. Of course, other borehole configurations, such as, for example, open holes, which may be used in oil well applications, may be used. The probe 118 may be suspended in the borehole 120 by a tether 126, for example, a cable, coiled tubing, or other tethering device. The probe 118 may be conveyed within the borehole 120 by different conveyance techniques, for example, wireline, slickline, through logging conditions (TLC), and logging while drilling. In some embodiments, the probe 118 may also be deployed for permanent monitoring.

A multi-conductor power supply cable 130 may be carried by the tether 126 and provides electrical power from above the subterranean formation 101, i.e. the surface. Power supply circuitry 132 provides the electrical power downhole to the probe 118 including the electrical components therein.

Figure 2:
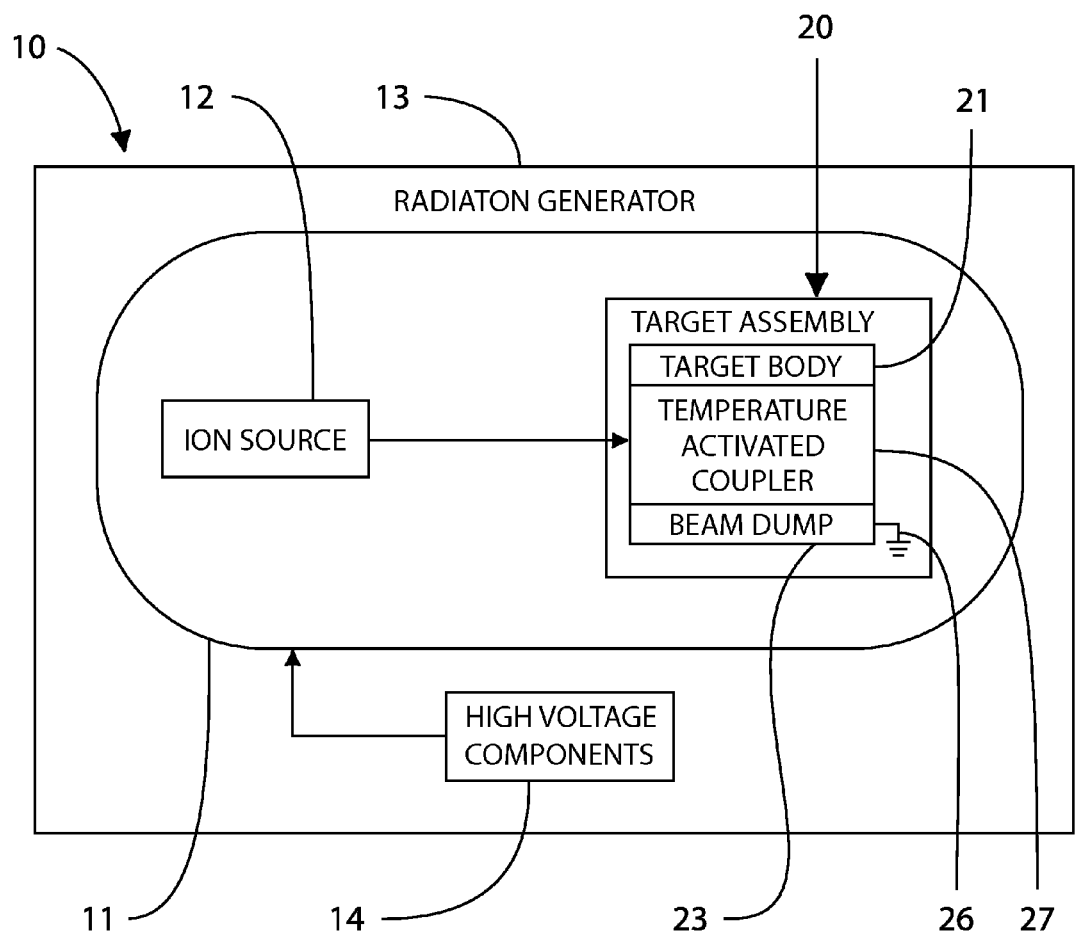
FIG. 2 is a schematic block diagram of the radiation generator of FIG. 1.

Referring now additionally to FIG. 2, the logging tool 100 includes a radiation generator 10, for example, a neutron generator, carried by the probe 118 and that includes a sealed hollow cylindrical tube or sealed envelope 11. An ion source 12 is positioned at one end of the sealed envelope 11, and a target electrode or assembly 20 is at the other end of the sealed envelope. The sealed envelope 11 and supporting high voltage electrical components 14 are enclosed in a radiation generator housing 13. Radiation generator supporting electrical circuit components, which may be relatively low voltage, for example, radiation generator control circuitry 114, downhole telemetry circuitry 112, and radiation detectors 116A, 116B are carried by the probe 118 and coupled to the radiation generator 10. Of course, while two radiation detectors 116A, 116B are illustrated, it will be appreciated that any number of radiation detectors may be carried by the probe 118. Other or additional circuitry, which may be coupled to the radiation generator 10 may also be carried by the probe 118. Alternatively, in other conveyance techniques, for example, power may be supplied by batteries and/or a downhole power generator.

The radiation generator 10 is operated to emit radiation, for example, neutrons, to irradiate the subterranean formation 101 adjacent the probe 118 with radiation. Radiation, for example, neutrons and/or photons (gamma-rays), that returns from the subterranean formation 101 is detected by the radiation detectors 116A, 116B. The outputs of the radiation detectors 116A, 116B are communicated to the surface by cooperation of downhole telemetry circuitry 112 and surface telemetry circuitry 132, and analyzed by a signal analyzer 134 to obtain information regarding the subterranean formation 101.

The signal analyzer 134 may include a computer system executing signal analysis software for obtaining information regarding the subterranean formation 101. More particularly, oil, gas, water, and the elements of geological or subterranean formations possess distinctive radiation signatures that permit identification of such formations. In some embodiments, signal analysis may alternatively or additionally be performed downhole within the probe 118. The radiation generator 10 may also be used in conjunction with other logging tools, including, but not limited to those described in U.S. Pat. No. 4,794,792 to Flaum et al., U.S. Pat. No. 4,721,853 to Wraight, U.S. Pat. No. 4,600,838 to Steinman et al., U.S. Pat. No. 5,313,504 to Czirr, and U.S. Pat. No. 7,073,378 to Smits et al., the entire contents of each of which are hereby incorporated by reference.

A neutron tube or generator may include two gas reservoirs. The first gas reservoir is the getter or filament, which functions as a pressure control reservoir. The other gas reservoir is the beam dump/target, where most of the gas is stored. The target is the location where the fusion reaction occurs. As determined through experiment, the secondary gas reservoir may not be included. During the experiment, a grounded target neutron tube was controlled by adjusting the temperature of the target or beam dump with a heater cartridge.

Because it is possible to control a radiation generator, for example, a neutron generator, by adjusting the temperature of the target or beam dump, a radiation generator may be produced without a secondary gas reservoir, or a getter/filament. The temperature of the beam dump can be passively controlled using the target assembly 20 described in further detail below, and additionally may be actively controlled with a heating cartridge, for example.

It will be appreciated that the target assembly 20 described herein may also be particularly useful for a high temperature well logging tool, where it may be particularly desirable to save energy. Any watt of power saved reduces the temperature of the tool. Therefore, a neutron tube, for example, that can function without a getter or filament, and uses about 2 watts of power may be particularly desirable.

Figure 3:
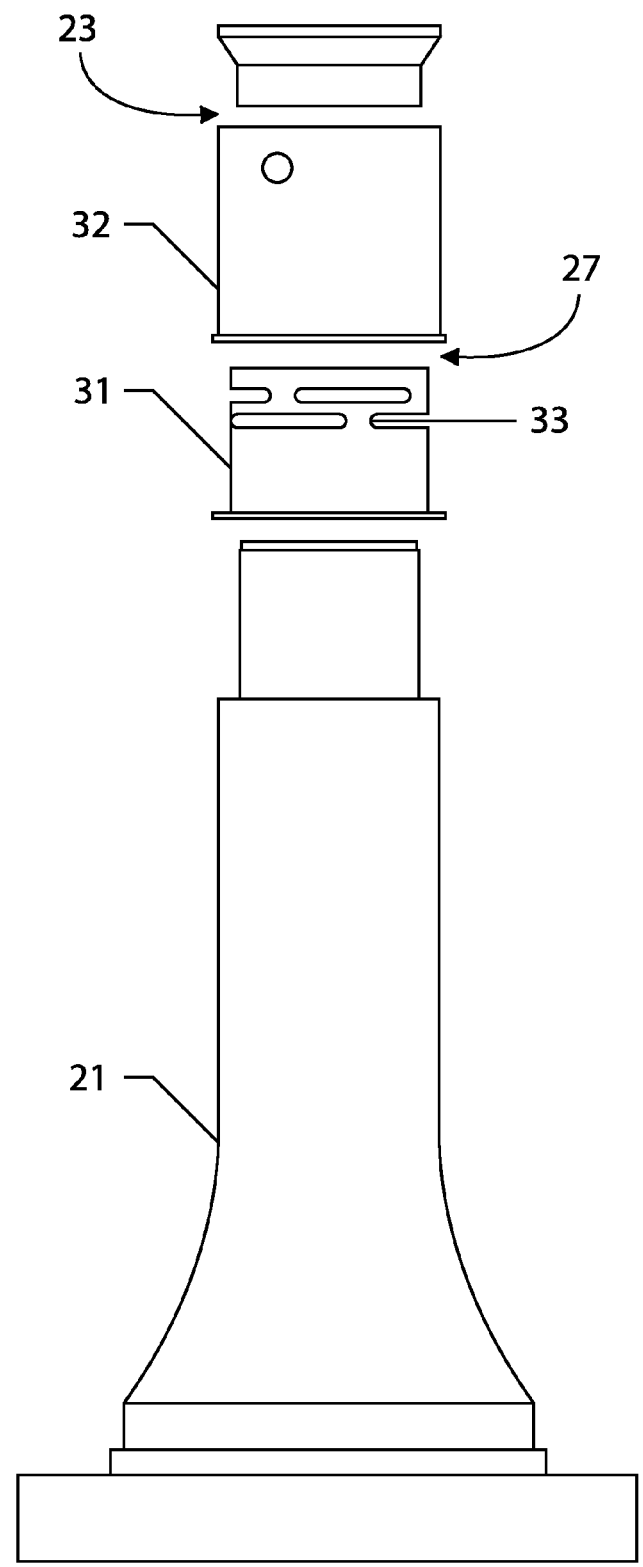
FIG. 3 is an exploded perspective view of a target assembly of the radiation generator in FIG. 2.
Figure 4:
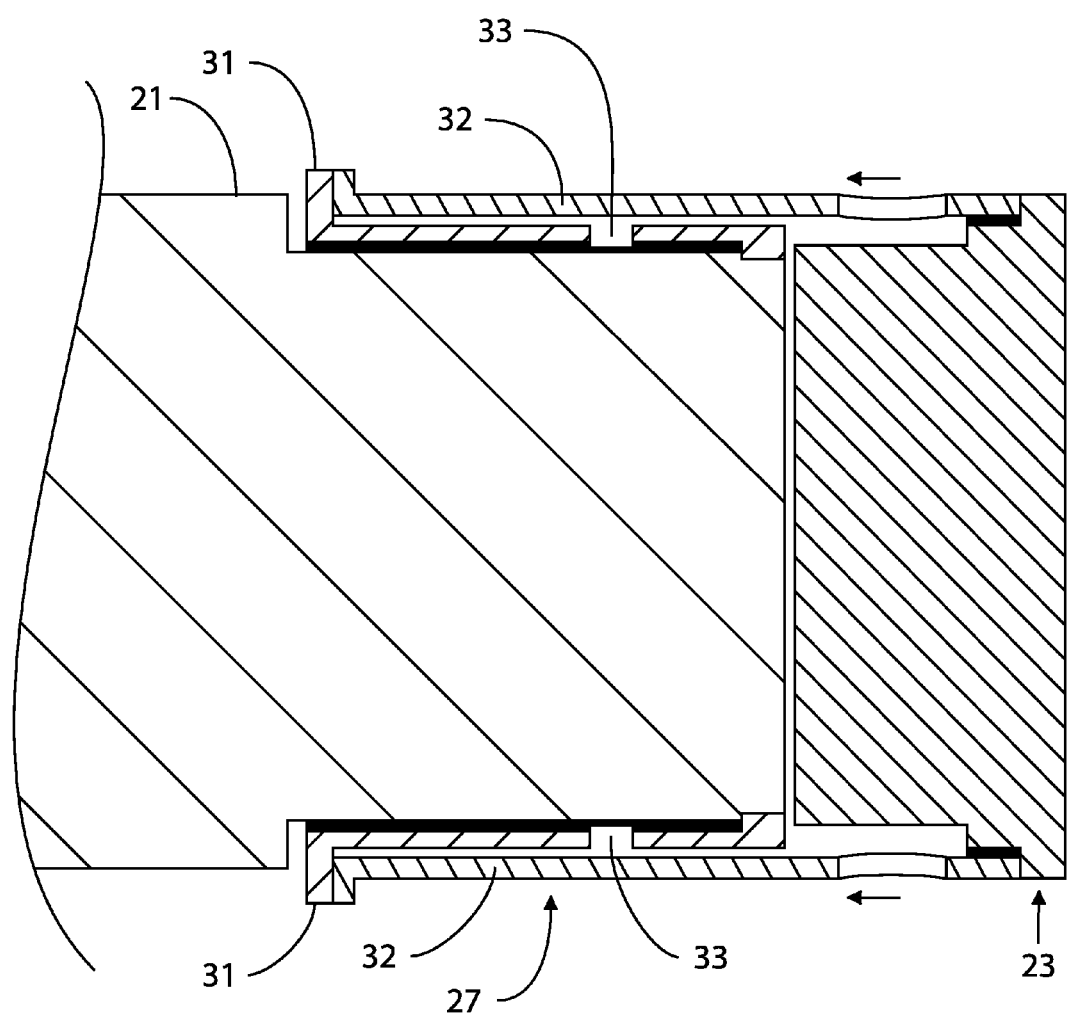
FIG. 4 is an enlarged cross-sectional view of a portion of the target assembly of FIG. 3.

Referring now additionally to FIGS. 3 and 4, the target assembly 20 includes a target body 21 and a beam dump 23 or target. The beam dump 23 may be coupled to a reference voltage 26, for example, a ground.

A temperature activated coupler 27 is between the target body 21 and the beam dump 23. More particularly, the temperature active coupler 27 mechanically and electrically couples the target body 21 and the beam dump 23. The temperature activated coupler 27 moves the beam dump 23 between a non-contact position with the target body 21 and a contact position with the target body based upon temperature.

The temperature activated coupler 27 includes an inner sleeve 31 coupled to the target body 21 and an outer sleeve 32 surrounding the inner sleeve and coupled to the inner sleeve and the beam dump 23. The inner sleeve 31 and the outer sleeve 32 have different coefficients of thermal expansion (CTEs). More particularly, the outer sleeve 32 has a lower CTE than the inner sleeve 31. In some embodiments, the outer sleeve 32 may have a higher CTE than the inner sleeve 31.

The outer sleeve 32 may include one of Kovar, Invar, and molybdenum. Of course the outer sleeve may include other or additional materials, which may have a relatively low CTE, for example. The inner sleeve 31 may include one of copper and stainless steel, for example, stainless steel 300 series. Of course, the inner sleeve 31 may include other or additional materials.

As long as the beam dump 23 has a temperature lower than the one specific to the design, the contact between the beam dump 23 and the target body 21 is open or in the non-contact position. Once the temperature of the beam dump 23 and the inner and outer sleeves 31, 32 increases, the inner and outer sleeves expand based upon the temperature causing, the beam dump to move closer to the target body 21 until the contact position. Once the beam dump 23 touches the target body 21, heat is drawn into the target body. If the target body 21 is cold enough, the beam dump 23 cools enough to break the contact. And, if the target body 21 is too hot and cannot evacuate the heat, the temperature of the beam dump 23 still increases along with the contact pressure between the beam dump and the target body.

The inner sleeve 31 has slots 33 therein. The slots 33 provide stress relief to thereby reduce breakage of the target assembly 20 in case of overheating. The slots 33 also increase the thermal resistance so that the inner and outer sleeves 31, 32 heat up faster and have a more similar temperature.

As will be appreciated, the inner and outer sleeves 31, 32 more or less acts as a thermostat for the beam dump 23 which is a gas reservoir. Consequently, because of a temperature/pressure relation, the target assembly 20 acts as a pressure regulator. To start the generation of radiation, for example, if a neutron tube is built with the target assembly 20, either a minimum base pressure (0.5-1 mTorr) to provide the initial power to heat up the target or beam dump 23, and therefore, release the gas for regular operation, or an active heating system to jump start the process may be desired.

Figure 5:
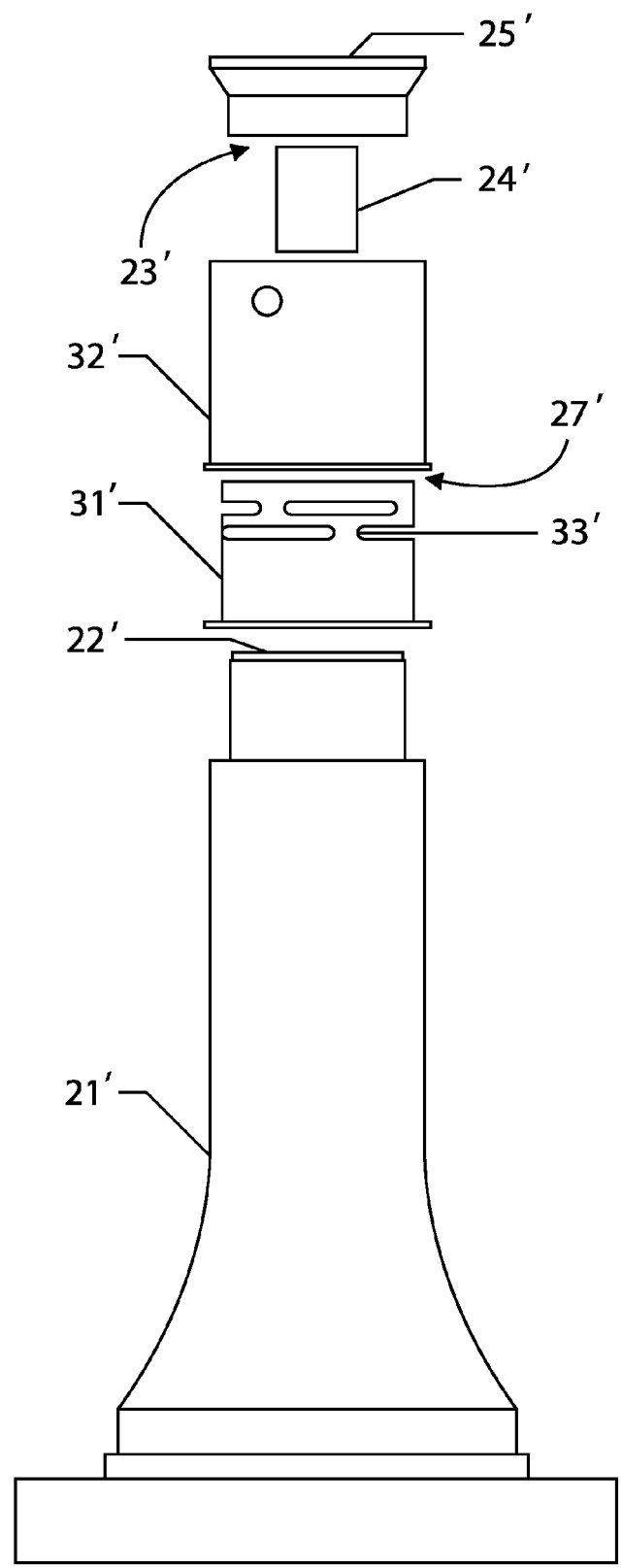
FIG. 5 is an exploded perspective view of a target assembly of a radiation generator in accordance with another embodiment.
Figure 6:
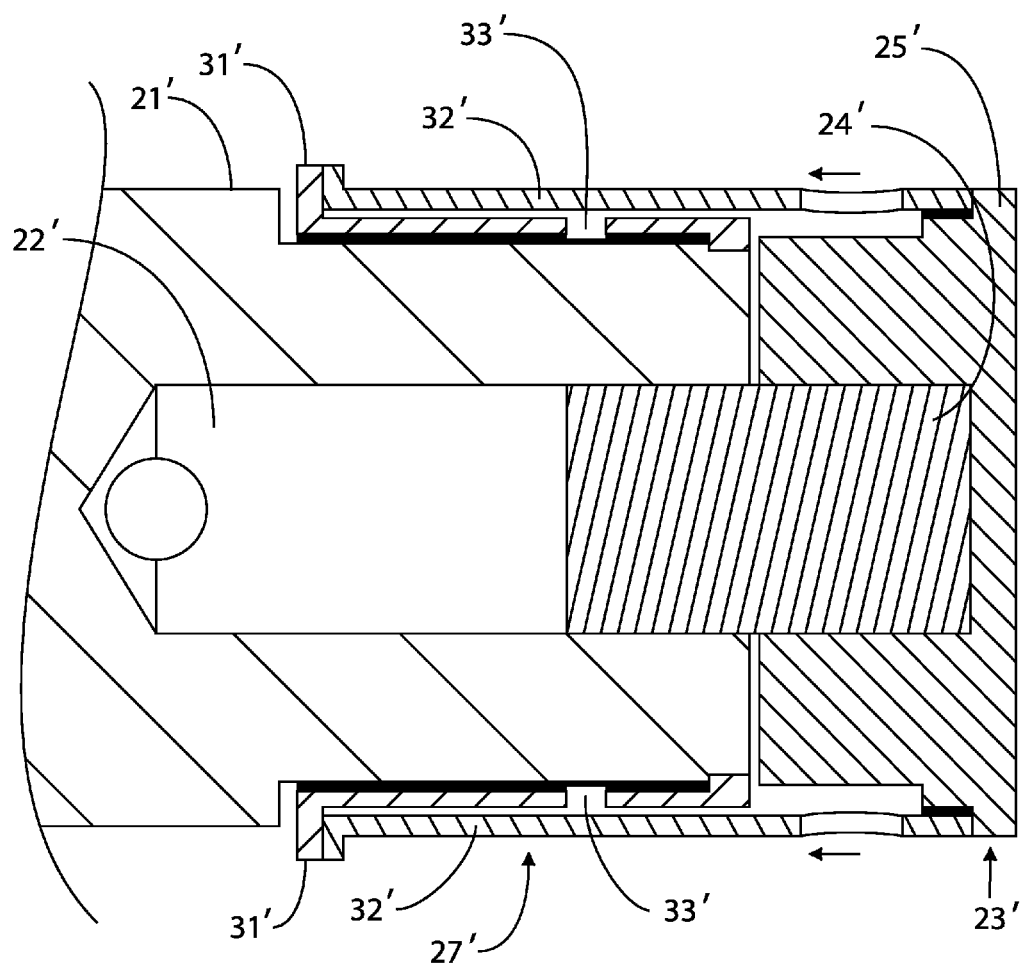
FIG. 6 is an enlarged cross-sectional view of a portion of the target assembly of FIG. 5.

Referring now to FIGS. 5 and 6, another embodiment may be particularly advantageous for while-drilling applications, for example, where increased support of the beam dump 23' may be desired. In particular, the target body 21' has a cavity 22' therein. The beam dump 23' includes a shaft 24' slidably movable within the cavity 22' and an end cap 25' coupled to the shaft.

The temperature activated coupler 27' moves the end cap 25' between a non-contact position with the target body 21' and a contact position with the target body based upon temperature. Indeed, the shaft 24' and the end cap 25' arrangement of the beam dump 23', and more particularly, the shaft being slidably movable within the cavity 22', may be particularly advantageous for a relatively high impact, shock, or vibration environment. The shaft 24' aids in maintaining the beam dump 23' in a centered position, and may include a relatively low or non-thermally conductivity material relative to the end cap 25'. The relatively low thermal conductivity material of the shaft 24' provides greater heat transfer control, and thus the shaft has a reduced effect on the operation of the inner and outer sleeves 31', 32'.

Moreover, similar to that described above, an increase in the temperature of the beam dump 23' and the inner and outer sleeves 31', 32' causes the inner and outer sleeves expand based upon the temperature causing, the beam dump, and more particularly, the end cap 25' to move closer to the target body 21' until the contact position. Once the beam end cap 25' touches the target body 21', heat is drawn into the target body. If the target body 21' is cold enough, the beam dump 23' cools enough to break the contact. And, if the target body 21' is too hot and cannot evacuate the heat, the temperature of the beam dump 23' still increases along with the contact pressure between the end cap 25' and the target body.

A method aspect is directed to a method of controlling a temperature of a beam dump 23 that includes a shaft 24 slidably movable within a cavity 22 of a target body 21 and an end cap 25 coupled to the shaft, and a temperature activated coupler 27 between the target body and the beam dump. The method includes exposing the temperature activated coupler 27 to changing temperatures to move the end cap 25 between a non-contact position with the target body 21 and a contact position with the target body.

While a particular embodiment of a radiation generator 10 has been described with respect to well logging and a well logging tool, it should be appreciated that the radiation generator may be used in other logging tools as well as other applications. In addition, while particular configurations have been disclosed with reference to the radiation generator 10, it will be appreciated that other configurations could be used as well.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A target assembly for a radiation generator comprising:
a target body;
a beam dump; and
a temperature activated coupler between said target body and said beam dump to move said beam dump between a non-contact position with said target body and a contact position with said target body based upon temperature.

2. The target assembly of claim 1, wherein said target body has a cavity therein; wherein said beam dump comprises a shaft slidably movable within the cavity and an end cap coupled to said shaft; and wherein said temperature activated coupler moves said end cap between the non-contact and contact positions.

3. The target assembly of claim 1, wherein said temperature activated coupler comprises an inner sleeve coupled to said target body and an outer sleeve surrounding said inner sleeve and coupled to inner sleeve and said beam dump.

4. The target assembly of claim 3, wherein said inner sleeve and said outer sleeve have different coefficients of thermal expansion (CTEs).

5. The target assembly of claim 3, wherein said outer sleeve has a lower coefficient of thermal expansion (CTE) than said inner sleeve.

6. The target assembly of claim 3, wherein said outer sleeve comprises one of nickel-cobalt alloy, nickel-iron alloy, and molybdenum.

7. The target assembly of claim 3, wherein said inner sleeve comprises one of copper and stainless steel.

8. The target assembly of claim 3, wherein said inner sleeve has a plurality of slots therein.

9. The target assembly of claim 2, wherein said shaft has a lower thermal conductivity than said end cap.

10. The target assembly of claim 1, wherein said beam dump is coupled to a reference voltage.

11. The target assembly of claim 1, wherein said target body is electrically coupled to said beam dump.

12. A logging tool for a borehole within a subterranean formation comprising:
at least one radiation detector; and
a radiation generator coupled to said at least one radiation detector and comprising
an ion source, and a target assembly spaced from said ion source and comprising
a target body, a beam dump, and a temperature activated coupler between said target body and
said beam dump to move said beam dump between a non-contact position with said target body and a contact position with said target body based upon temperature.

13. The logging tool of claim 12, wherein said target body has a cavity therein; wherein said beam dump comprises a shaft slidably movable within the cavity and an end cap coupled to said shaft; and wherein said temperature activated coupler moves said end cap between the non-contact and contact positions.

14. The logging tool of claim 12, further comprising telemetry circuitry coupled to said at least one radiation detector and said radiation generator.

15. The logging tool of claim 12, further comprising a housing carrying said at least one radiation detector and said radiation generator.

16. The logging tool of claim 12, wherein said temperature activated coupler comprises an inner sleeve coupled to said target body and an outer sleeve surrounding said inner sleeve and coupled to inner sleeve and said beam dump.

17. The logging tool of claim 16, wherein said inner sleeve and said outer sleeve have different coefficients of thermal expansion (CTEs).

18. The logging tool of claim 16, wherein said outer sleeve has a lower coefficient of thermal expansion (CTE) than said inner sleeve.

19. A method of controlling a temperature of a beam dump with a temperature activated coupler between a target body and the beam dump, the method comprising: exposing the temperature activated coupler to changing temperatures to move the beam dump between a non-contact position with the target body and a contact position with the target body.

20. The method of claim 19, wherein the beam dump comprises a shaft slidably movable within a cavity of the target body and an end cap coupled to the shaft; and wherein exposing the temperature activated coupler comprises exposing the temperature activated coupler to changing temperatures to move the end cap between a non-contact position with the target body and a contact position with the target body.

21. The method of claim 19, wherein the temperature activated coupler comprises an inner sleeve coupled to the target body and an outer sleeve surrounding the inner sleeve and coupled to inner sleeve and the beam dump.

22. The method of claim 21, wherein the inner sleeve and the outer sleeve have different coefficients of thermal expansion (CTEs).

23. The method of claim 21, wherein the outer sleeve has a lower coefficient of thermal expansion (CTE) than the inner sleeve.

* * * * *